United States Patent [19]

Sheehan et al.

[11] Patent Number: 5,264,528
[45] Date of Patent: Nov. 23, 1993

[54] PROCESS FOR THE PREPARATION OF 4-HYDROXYSTYRENE POLYMERS FROM 4-ACETOXYSTYRENE POLYMERS

[75] Inventors: Michael T. Sheehan, Corpus Christi, Tex.; Brad L. Smith, Wilmington, N.C.

[73] Assignee: Hoechst Celanese Corporation, Somerville, N.J.

[21] Appl. No.: 977,475

[22] Filed: Nov. 17, 1992

Related U.S. Application Data

[63] Continuation-in-part of Ser. No. 622,919, Dec. 6, 1990, abandoned.

[51] Int. Cl.⁵ ............................................... C08F 8/12
[52] U.S. Cl. .............................. 525/384; 525/329.5; 525/377; 525/378; 525/380; 525/383

[58] Field of Search ............. 525/380, 378, 384, 329.5

[56] References Cited

U.S. PATENT DOCUMENTS

| | | | |
|---|---|---|---|
| 4,678,843 | 7/1987 | Elmore | 525/378 |
| 4,877,843 | 10/1989 | Gupta | 525/344 |
| 4,912,173 | 3/1990 | Keene | 525/378 |

Primary Examiner—Joseph L. Schofer
Assistant Examiner—Fred Zitomer
Attorney, Agent, or Firm—James J. Mullen; Donald R. Cassady; Michael W. Ferrell

[57] ABSTRACT

Copolymers of 4-hydroxystyrene are produced by hydrolyzing copolymers of 4-acetoxystyrene with hydroxylamine.

15 Claims, No Drawings

PROCESS FOR THE PREPARATION OF 4-HYDROXYSTYRENE POLYMERS FROM 4-ACETOXYSTYRENE POLYMERS

RELATED PATENT APPLICATIONS

This application is a continuation-in-part of copending application Ser. No. 07/622,919 filed Dec. 6, 1990 now abandoned.

TECHNICAL FIELD OF THE INVENTION

The present invention relates to the field of copolymers of 4-hydroxystyrene and, more particularly, to a process for the preparation of such copolymers. Still more particularly, the present invention discloses a method of preparing copolymers of 4-hydroxystyrene by hydrolyzing copolymers of 4-acetoxystyrene with hydroxylamine without having to put the copolymer of 4-acetoxystyrene or 4-hydroxystyrene into solution.

BACKGROUND OF THE INVENTION

Homopolymers and copolymers of 4-hydroxystyrene, a compound which is also known as p-vinylphenol, are well known compositions which are used in the manufacturing of metal treatment compositions, photoresists, epoxy resins and epoxy resin curing agents. Polymers of 4-hydroxystyrene can be produced by polymerizing the 4-hydroxystyrene monomer. That monomer, however, is an unstable compound under room temperature and must be stored under low temperatures provided by refrigeration to prevent its spontaneous polymerization. Even under low temperatures, the monomer slowly polymerizes to low molecular weight polymers.

Because of the instability of the 4-hydroxystyrene monomer, alternative routes for preparing polymers of 4-hydroxystyrene have been utilized using 4-acetoxystyrene, the acetic acid ester of 4-hydroxystyrene, as the starting compound. 4-Acetoxystyrene is a stable monomer which can be readily polymerized and copolymerized to low, medium and high molecular weight polymers. Those processes involve the polymerization of the 4-acetoxystyrene monomer, followed by the hydrolysis of the phenolic ester groups of the 4-acetoxystyrene polymers to produce 4-hydroxystyrene polymers.

Corson et al., *Preparation of Vinylphenols and Isopropenylphenols*, 23 J. Org. Chem. 544–549 (1958) (hereinafter referred to as "Corson, et al."), discloses a process for making 4-hydroxystyrene from phenol. According to that process, phenol is acylated to 4-hydroxyacetophenone which is then acetylated to 4-acetoxyacetophenone. The latter compound is hydrogenated to 4-acetoxyphenylmethylcarbinol which is, then, dehydrated to 4-acetoxystyrene. The 4-acetoxystyrene is saponified to 4-hydroxystyrene using potassium hydroxide.

Packham, *Chelating Polymers Derived from Poly-4-Hydroxystyrene*, 1964 J. of the Chemical Society 2617–2624, describes the hydrolysis of cross-linked poly (4-hydroxystyrene) by refluxing the polymer in alkaline aqueous dioxan. Arshady, et al., *Phenolic Resins for Solid-Phase Peptide Synthesis: Copolymerization of Styrene and p-Acetoxystyrene*, 12 J. of Polymer Science 2017–2025 (1974), describes the hydrolysis of copolymers of styrene and p-acetoxystyrene to the vinylphenol polymer using hydrazine hydrate in dioxane.

Chen, et al., *A Morphological Analogue of Japanese Lacquer. Grafting of p-Hydroxystyrene onto Pullulan by Ammonium Persulfate Initiation in Dimethylsulfoxide*, 23 J. Polymer Science: Polymer Chem. Ed. 1283–1291 (1985) describes the hydrolysis of p-acetoxystyrene grafted pullulan to p-hydroxystyrene pullulan with hydrazine hydrate. Nakamura, et al, *Effect of Substituent Groups on Hydrogen Bonding of Polyhydroxystyrene Derivatives*, 15 Polymer J. 361–366 (1983), describes the hydrolysis of poly(p-acetoxystyrene) dissolved in acetone to poly(p-hydroxystyrene) with hydrochloric acid.

U.S. Pat. No. 2,276,138 discloses the ester interchange reaction of poly (4-acetoxystyrene) in methanol using sodium methylate. About 84 percent of the acetate groups are removed by the interchange reaction.

U.S. Pat. No. 3,547,858 discloses a process for the production of polymers containing hydroxyl groups which comprises subjecting a polymer of an ester of an unsaturated alcohol to the action of a hydrolyzing agent while the polymer is in the molten state. In the hydrolysis reaction, the ester groups are replaced by hydroxyl groups. Water and, preferably, a lower alkyl alcohol can be used as a hydrolyzing agent.

U.S. Pat. No. 4,544,704 discloses the hydrolysis of a copolymer of styrene and p-isopropenylphenylacetate with aqueous sodium hydroxide in methanol and toluene using a small amount of benzyltrimethylammonium chloride as a phase transfer agent.

U.S. Pat. No. 4,678,843 discloses a process for hydrolyzing polymers of 4-acetoxystyrene to polymers of p-vinylphenol, and which process is conducted entirely in solution. Ammonia is the hydrolysis catalyst. The 4-acetoxystyrene polymer is dissolved in a solvent which is miscible with water. Ammonia gas or ammonium hydroxide is added to the solution and the hydrolysis reaction is carried out at a temperature of about 50° C. to about 150° C. for a time sufficient to hydrolyze the acetoxy groups to phenol groups. At the end of the hydrolysis reaction, wet carbon dioxide gas is introduced into the reaction solution as a sparge below the solution surface to remove the ammonium salt. The 4-hydroxystyrene polymer is recovered for use as an organic solvent solution and can be recovered as a solid by removal of all solvents by vacuum distillation or by precipitating the polymer from the solution.

U.S. Pat. No. 4,689,371 discloses the production of poly-(4-vinylphenol) by hydrolyzing polymers of 4-acetoxystyrene by methanolysis with quaternary ammonium hydroxides as the catalyst. The 4-acetoxystyrene polymer is dissolved in a solvent which is miscible with water. Ammonium hydroxide is added and the reaction is carried out at a temperature of about 50° C. to about 80° C. for a time sufficient to hydrolyze the acetoxy group. The reaction product is heated to a temperature of about 50° C. to about 150° C. to distill off methyl acetate and the decomposition products of the quaternary ammonium hydroxide. The 4-vinylphenol polymer can be used per se as a solution or it can be recovered as a solid by removal of all solvents by vacuum distillation or by precipitating the polymer from the solution.

U.S. Pat. No. 4,822,862 discloses the production of homopolymers and copolymers of p-vinylphenol by hydrolyzing homopolymers or copolymers of 4-acetoxystyrene with a base such as an alkali metal hydroxide, an ammonium hydroxide, a quaternary ammonium hydroxide or a water soluble amine. The hydrolysis reaction occurs in an emulsion containing the polymers of 4-acetoxystyrene in water, without isolating the polymer. The vinylphenol polymer is recovered from the emulsion by acidifying the reaction mass and by filtering, washing and drying the solid polymer or by coagulating the emulsion with alum and, after acidification, recovering, washing and drying the solid polymer.

U.S. Pat. No. 4,857,601 discloses the selective hydrolysis of copolymers of p-acetoxystyrene and dialkyl muconates or alkyl sorbates to copolymers of p-vinylphenol and dialkyl muconates or alkyl sorbates using acid or base catalysts in an alcohol or water. The reactant copolymer is slurried in an alcohol or aqueous base. The product is dissolved in the alcohol or aqueous base and is recovered as a solution.

U.S. Pat. No. 4,868,256 discloses the hydrolysis of polymers of 3,5-dibromo-4-acetoxystyrene to polymers of 3,5-dibromo-4-acetoxystyrene with a base or an acid such as tetramethyl ammonium hydroxide, aqueous $NH_3$, NaOH, KOH, HCl, and $H_2SO_4$.

U.S. Pat. No. 4,877,843 discloses the selective hydrolysis of copolymers of 4-acetoxystyrene and allyl esters of unsaturated acids slurried in an alcohol or water to copolymers of p-vinylphenol and allyl esters of unsaturated acids with an acid or a base. If the reaction is an alcoholysis reaction in alcohol, the polymer can be recovered by precipitating and coagulating the polymer in water. If the hydrolysis reaction is carried out in aqueous base, the polymer can be recovered from solution by precipitation with acid. The alcohols used are the one to four carbon alcohols. The acids used are mineral acids and organic acids with dissociation constants in aqueous solution of less than 2. The bases used are alkali metal hydroxides and alkoxides and quaternary ammonium hydroxides. The processes of this patent are conducted entirely in solution.

U.S. Pat. No. 4,898,916 discloses the production of polymers of 4-vinylphenol by the acid catalyzed transesterification of polymers of 4-acetoxystyrene in an alcohol. Polymers of 4-acetoxystyrene are slurried in an alcohol and are hydrolyzed to polymers of 4-vinylphenol in the presence of a mineral or organic acid as well as Lewis acids which have dissociation constants in aqueous solution of less than 2. The alcohols used are one to four carbon alcohols. The 4-vinylphenol polymer product is recovered as a solution in the alcohol to be used as such or it can be further recovered as a solid from such solutions by utilizing well known techniques.

U.S. Pat. No. 4,912,173 describes the hydrolysis of homopolymers of 4-acetoxystyrene suspended in water in finely divided particulate form to homopolymers of 4-hydroxystyrene using aqueous nitrogen bases. The nitrogen bases used are ammonia, primary, secondary or tertiary water soluble amines and water soluble quaternary ammonium hydroxides. When ammonium hydroxide is used as the base, the suspended polymer product remains in suspension and the water is removed by filtration, decantation or centrifugation. After washing and drying the polymer is ready for use. When other bases are used, the particles are sometimes softened or solubilized. Agglomerated polymers can be recovered by removing the water, washing and drying, as described above. Solubilized polymers are recovered after precipitation with acid. This patent only discloses processes for homopolymers.

U.S. Pat. No. 4,962,147 discloses the hydrolysis of poly(4-acetoxystyrene), in suspension in its polymerization medium, to poly(4-hydroxystyrene) with ammonia. Ammonia is preferably used as ammonium hydroxide. It can also be used in gaseous form which is preferably introduced below the surface of the aqueous reaction medium. During the hydrolysis reaction, the suspended homopolymer remains in suspension in solid finely divided form.

U.S. Pat. No. 4,965,400 discloses the hydrolysis of 3,5-disubstituted-4-acetoxystyrene to form substituted 3,5-disubstituted-4-hydroxystyrene analogs. The hydrolysis agents are $NH_3$, NaOH, KOH, tetramethylammonium hydroxide, HCl or $H_2SO_4$.

In most of the above referenced processes, the reaction was carried out with the reactants being in solution or the 4-hydroxystyrene polymer product was recovered as a solution. As a result, a large reactor volume was required to accommodate the reaction. Furthermore, in order to recover the product as a solid from the solution, certain steps had to be used such as precipitation with a non-solvent, acidification of the salt form of the polymer, spray drying or the like. Such steps were time-consuming and uneconomical because they required additives and/or energy. In each case, copolymers could not be hydrolyzed without being totally dissolved before or during hydrolysis.

According to the present invention, the hydrolysis reaction is carried out only in suspension and the copolymer product thereof is in suspension. The solid product is intact and is easily and economically recovered by well known techniques such as filtration.

Another disadvantage of prior processes was that, oftentimes, a satisfactory degree of hydrolysis of copolymers of 4-acetoxystyrene to copolymers of 4-hydroxystyrene could not be achieved when the amount of 4-acetoxystyrene in the reactant polymer was less than about fifty (50) weight percent of the total weight attributed to 4-acetoxystyrene and the copolymer polymerizable therewith. According to the present invention, copolymers of 4-acetoxystyrene are hydrolyzed to a satisfactory degree with hydroxylamine regardless of the amount of 4-acetoxystyrene present therein.

These and other advantages of the present invention will become apparent from the following description.

SUMMARY OF THE INVENTION

Copolymers of 4-acetoxystyrene are hydrolyzed with hydroxylamine to produce copolymers of 4-hydroxystyrene. The hydroxylamine is available to the reaction as a free base or from an acid salt of hydroxylamine which is neutralized with a base to provide the hydroxylamine.

The reaction is carried out with the solid reactants and the solid products being in suspension. The products are solid intact particles which are easily and economically recoverable by filtration or similar techniques.

In the case of copolymers, the reactants are hydrolyzed to a high degree, even in cases wherein the amount of 4-acetoxystyrene present in the reactant copolymer is substantially less than fifty (50) percent of the total weight attributed to 4-acetoxystyrene and the copolymer polymerizable therewith.

DETAILED DESCRIPTION OF THE INVENTION

According to the present invention, a process for the production of copolymers of 4-hydroxystyrene is disclosed by hydrolyzing polymers of 4-acetoxystyrene with hydroxylamine. In the process, the acetoxy groups of the 4-acetoxystyrene parts of the polymer are replaced with hydroxy groups to produce the 4-hydroxystyrene polymer. The process is used to convert copolymers of 4-acetoxystyrene to copolymers of 4-hydroxystyrene. The term polymer, as used herein, refers to a copolymer.

The reactant polymers of 4-acetoxystyrene are in suspension in the form of beads and are hydrolyzed by the hydroxylamine to produce polymers of 4-hydroxystyrene in suspension in the form of suspended intact solid particulates whereby the use of solvents and the difficulties associated therewith are eliminated. The solid polymer products are separated from the remaining compounds of the reaction mass by filtration, decantation or centrifugation and, after washing and drying, they are ready for use. When a sufficient amount of hydroxylamine is used, more than 98.0 percent and, in most cases, more than 99.5 percent of the polymers of 4-acetoxystyrene are hydrolyzed to the corresponding polymers of 4-hydroxystyrene.

The monomer 4-acetoxystyrene is a well known compound which can be produced by the method described in Corson et al, incorporated herein by reference, or by any other method known to those skilled in the art. The monomer readily polymerizes in solution, suspension, emulsion or bulk using well known free radical catalysts such as, for example, the peroxide and azo compounds. Such polymerization can take place in the absence of co-monomers whereby the resultant product is a homopolymer or in the presence of comonomers whereby the resultant product is a copolymer. Examples of processes used for the production of homopolymers or copolymers of 4-acetoxystyrene are the processes disclosed in U.S. Pat. Nos. 4,822,862, 4,912,173 and 4,962,147 which are incorporated herein by reference. Other well known processes can also be used.

In the case of copolymerization, the most commonly used comonomer is styrene. Other comonomers include vinyltoluene; alpha-methylstyrene; ortho-, meta-, and para- chloro- and bromostyrene; the diene monomers such as butadiene; the acrylate and methacrylate ester monomers such as methyl acrylate, methyl methacrylate, ethyl acrylate, butyl acrylate, butyl methacrylate and 2-ethylhexyl acrylate; acrylonitrile; methacrylonitrile; the polymerizable acids such as acrylic acid, methacrylic acid, maleic acid, fumaric acid and the like; and the allyl ester comonomers described in U.S. Pat. No. 4,877,843. It should be noted that, although copolymers of 4-acetoxystyrene and maleic anhydride are hydrolyzable by hydroxylamine, such hydrolysis is not desirable for the production of copolymers of 4-hydroxystyrene and maleic anhydride because the hydroxylamine opens the rings of the maleic anhydride.

Useful copolymers of 4-acetoxystyrene contain about one (1) to about 99 parts by weight of 4-acetoxystyrene to about 99 to about one (1) part of comonomer polymerizable therewith. Alternatively stated, in useful copolymers, the amount of 4-acetoxystyrene is in the range of about one (1) to about 99 weight percent of the total weight attributed to 4-acetoxystyrene and the comonomer polymerizable therewith. Preferred copolymers contain about five (5) to about 75 parts by weight of 4-acetoxystyrene to about 75 to about five (5) parts by weight of comonomer.

In the prior art hydrolysis processes, copolymers containing an amount of 4-acetoxystyrene of about 75 or more weight percent of the total weight attributed to 4-acetoxystyrene and the comonomer polymerizable therewith were hydrolyzed to a satisfactory degree. Copolymers, however, containing a lesser amount of 4-acetoxystyrene were difficult to hydrolyze to a satisfactory degree because the comonomer inhibited the hydrolysis of the 4-acetoxystyrene parts of the polymer. According to the present invention, 4-acetoxystyrene copolymers containing an amount of 4-acetoxystyrene as low as one (1) weight percent of the total weight attributed to 4-acetoxystyrene and the comonomer polymerizable therewith are hydrolyzed to a degree wherein more than 98.0 percent of the 4-acetoxystyrene parts of the copolymer are hydrolyzed to 4-hydroxystyrene parts.

The critical feature of the present invention is the use of a particular hydrolyzing agent to effect the hydrolysis of the acetoxystyrene to hydroxystyrene both of which cannot be in solution in order to achieve the desired end results. If one were to use ammonia or primary, secondary, or tertiary amines, i.e. organic amines, the end result could not be achieved. The hydrolyzing agent of the present invention is hydroxylamine. Hydroxylamine is available to the reaction as a free base or from an acid salt thereof such as hydroxylamine hydrochloride or hydroxylamine sulfate which is neutralized with aqueous ammonia or with any other base which does not interfere with the hydrolysis of the polymer reactant with the hydroxylamine. The stoichiometric amount of hydroxylamine required is one (1) mole of hydroxylamine per mole of 4-acetoxystyrene monomer present in the reaction. An excess amount of about one hundred ten (110) to about four hundred (400) mole percent is used, however, to ensure satisfactory completion of the hydrolysis of the 4-acetoxystyrene parts. The hydroxylamine diffuses into the solid reactant polymers of 4-acetoxystyrene and interacts with the acetoxy parts thereof to convert them to hydroxy parts.

In carrying out the hydrolysis reaction, copolymers of 4-acetoxystyrene are suspended as solid particles in water. The size of the particles is in the range of about 0.01 to about 2.0 millimeters. A suspension agent which is inert to the reaction may be used to assist the suspension. An example of such agent is a polyacrylic acid solution having a molecular weight of about 190,000, previously being known by the trademark Acrysol A3, but presently being known by the trademark Acumer 1530, manufactured by Rohm and Haas Company and described in Rohm and Haas Company Technical Bulletin FC-103, dated 1990 (hereinafter referred to as "Acrysol A3"). The use of a suspension agent, however, is not necessary. When hydroxylamine is used as a free base, hydroxylamine which is preferably in an aqueous solution is added to the suspension. When the hydroxylamine is available to the reaction from a salt of the hydroxylamine, that salt and the base for neutralizing such salt to obtain the hydroxylamine are added to the suspension. The reactants are continuously stirred by well known stirring means to maintain the homogeneity of the suspension and are heated to a temperature of about 50° C. to about 95° C. until the desired amount of hydrolysis is obtained.

Depending on the degree of heating and the nature of the reactants, the hydrolysis takes place in about one (1) to about six (6) hours with more than 98.0 percent and, in most cases, more than 99.5 percent of the 4-acetoxystyrene parts of the polymer being converted to 4-hydroxystyrene.

The reaction is carried out in a batch mode under atmospheric or slightly above atmospheric conditions. In order to obtain a polymer product with a desirable color, the reaction is carried out under an oxygen-free environment. Accordingly, nitrogen is provided to the reaction mass to maintain such environment. It should be understood, however, that an oxygen-free environment is necessary only for the purpose of obtaining a desirable polymer color and that the hydrolysis reaction described herein can proceed, even in the presence of oxygen. In the latter case, the polymers have a dark, undesirable color.

The 4-hydroxystyrene polymer products are white solid particles which are intact and which do not dissolve in the reaction mass. The solid particles are easily separated from the reaction mass by filtration, centrifugation or decantation. The separated particles are washed and dried and are ready for use.

The following examples further illustrate the invention but are not to be construed as limitations on the scope of the invention contemplated herein.

EXAMPLE 1

A five hundred (500) milliliter round bottom flask was fitted with a chilled water reflux condenser, a thermowell with a thermocouple, a nitrogen purge fitting, an overhead stirrer and an external heating mantel. One hundred (100) grams of deionized water, four (4) grams of a 25 weight percent aqueous polyacrylic acid solution (the suspension agent previously referred to as Acrysol A3, twenty (20) grams of a 25/75 mole ratio of a copolymer of 4-acetoxystyrene/styrene having a weight average molecular weight of 20,700, and 32.65 grams of hydroxylamine sulfate were added to the flask. The reaction mixture was treated with a minimum amount of 28 weight percent by weight aqueous ammonia to raise its pH to 10.

The reaction mixture was stirred to suspend the 4-acetoxystyrene/styrene copolymer and heated to 85° C. over a period of three (3) hours. At the end of that period, a sample of the suspended solid bead was placed in methanol and did not dissolve. One (1) hour and ten (10) minutes later, another sample was analyzed by FTIR and the analysis showed that the hydrolysis was not complete. Two (2) hours later six (6) hours and ten (10) minutes from the start of the procedure), another sample of the suspended polymer beads was taken and analyzed by Foureier Transform Infra Red (FTIR). The analysis showed that the sample was completely hydrolyzed to 4-hydroxystyrene copolymer.

The reaction mixture was cooled and the suspended solid particles of the product were removed from the reaction mass by filtration. Then, they were washed with deionized water and dried overnight in a vacuum oven at 70° C.

EXAMPLE 2

A five hundred (500) milliliter round bottom flask was fitted with a chilled water reflux condenser, a thermowell with a thermocouple, a nitrogen purge fitting, an overhead stirrer and an external heating mantel. One hundred (100) grams of deionized water, four (4) grams of a 25 weight percent aqueous polyacrylic acid solution (the suspension agent previously referred to as Acrysol A3, 15 grams of a 10/90 mole ratio copolymer of 4-acetoxystyrene/styrene having a weight average molecular weight of 19,800, and 8.16 grams of hydroxylamine sulfate were added to the flask. The pH of the mixture was raised to 10 with a minimum amount of 28 weight percent by weight aqueous ammonia.

The reaction mixture was stirred to suspend the 4-acetoxystyrene/styrene copolymer and heated to 87° C. over a period of 5.5 hours. At the end of that period, a sample of the suspended polymer beads was taken and analyzed by FTIR. The analysis showed that the sample was hydrolyzed more than fifty (50) percent to 4-hydroxystyrene/styrene copolymer.

The reaction mixture was cooled and the suspended solid particles of the product were removed from the reaction mass by filtration. Then, they were washed with deionized water and dried overnight in a vacuum oven at 70° C.

EXAMPLE 3

A three hundred (300) milliliter round bottom flask was fitted with a chilled water reflux condenser, a thermowell with a thermocouple, a nitrogen purge fitting, a magnetic stirrer and an external heating mantel. Seventy-five (75) grams of deionized water, three (3) grams of a 25 weight percent aqueous polyacrylic acid solution (the suspension agent previously referred to as Acrysol A3, 15 grams of a 10/90 mole ratio copolymer of 4-acetoxystyrene/styrene having a weight average molecular weight of 19,700, and 8.19 grams of hydroxylamine hydrochloride were added to the flask. The pH of the mixture was raised to 10 as described in the prior examples with aqueous ammonia.

The reaction mixture was stirred to suspend the 4-acetoxystyrene polymer and heated to 85° C. over a period of 5.5 hours. At the end of that period, a sample of the suspended polymer beads was taken and analyzed by FTIR. The analysis showed that the sample was hydrolyzed more than ninety (90) percent to 4-hydroxystyrene/styrene copolymer.

The reaction mixture was cooled and the suspended solid particles of the product were removed from the reaction mass by filtration. Then, they were washed with deionized water and dried overnight in a vacuum oven at 70° C.

EXAMPLE 4

A two hundred fifty (250) milliliter round bottom flask was fitted with a chilled water reflux condenser, a thermowell with a thermocouple, a nitrogen purge fitting, an overhead stirrer and an external heating mantel. One hundred (100) grams of deionized water, four (4) grams of a 25 weight percent aqueous polyacrylic acid solution (the suspension agent previously referred to as Acrysol A3, ten (10) grams of a 25/75 mole ratio copolymer of 4-acetoxystyrene/styrene having a molecular weight of 20,700, and 6.15 grams of hydroxylamine hydrochloride were added to the flask. The pH of the mixture was raised to 10 as described in the previous examples.

The reaction mixture was stirred to suspend the 4-acetoxystyrene/styrene copolymer and heated to 89° C. over a period of four (4) hours. At the end of that period, a sample of the suspended polymer beads was taken and analyzed by FTIR. The analysis showed that the sample was completely hydrolyzed to 4-hydroxystyrene/styrene copolymer.

The reaction mixture was cooled and the suspended solid particles of the product were removed from the reaction mass by filtration. Then they were washed with deionized water and dried overnight in a vacuum oven at 70° C.

EXAMPLE 5

A two hundred fifty (250) milliliter round bottom flask was fitted with a chilled water reflux condenser, a thermowell with a thermocouple, a nitrogen purge fitting, an overhead stirrer and an external heating mantel. Eighty (80) grams of deionized water, 3.2 grams of a 25 weight percent aqueous polyacrylic acid solution (the suspension agent previously referred to as Acrysol A3, 15 grams of a 50/50 mole ratio copolymer of 4-acetoxystyrene/ethyl acrylate having a weight average molecular weight of 34,400, and 55.61 grams of hydroxylamine hydrochloride were added to the flask. The pH of the mixture was raised to 10 as described in the previous examples.

The reaction mixture was stirred to suspend the 4-acetoxystyrene/ethyl acrylate copolymer and heated to 43° C. for one (1) hour, 50° C. for one (1) hour and 61° C. for two (2) hours. At the end of that period, a sample of the suspended polymer beads was taken and analyzed by FTIR. The analysis showed that the sample was completely hydrolyzed to 4-hydroxystyrene/ethyl acrylate polymer.

The reaction mixture was cooled and the suspended solid particles of the product were removed from the reaction mass by filtration. Then, they were washed with deionized water and dried overnight in a vacuum oven at 70° C.

EXAMPLE 6 (COMPARATIVE)

In order to demonstrate the uniqueness and unexpected results obtained by using hydroxylamine versus other nitrogen compounds, ammonia was used in this comparative example. In two (2) separate 250 ml/2 neck flasks (A and B), there was separately added thirty (30) grams of a 50/50 by weight copolymer of 4-acetoxystyrene/styrene which was suspended in 100 ml of a 4% polyacrylic acid aqueous solution. To flask A, there was added 2.8 molar equivalents (12.16 grams) of $NH_4OH$ (38% by weight $NH_3$). To flask B, there was added 5.0 molar equivalents (27.63 grams) of $NH_4OH$ (38% by weight $NH_3$). Both flasks A and B were heated to and maintained at 80° C. over the next 6½ hours. The pH of each mixture was about ten (10). The heat source was removed from flask A after 6½ hours and samples were taken of the solid material of both flasks A and B in order to determine hydrolysis by FTIR. FTIR results showed that there was no hydrolysis in either sample from flasks A or B. Heating of flask B was continued overnight and after 18½ hours after the initial reaction, a solid sample was withdrawn and analyzed by FTIR. Again, there was no indication that any hydrolysis had taken place in flask B, even with substantial excess $NH_3$. The results of this comparative example were surprising when compared to the prior art, such as Keene (U.S. Pat. No. 4,912,173) which discloses that homopolymer of polyacetoxystyrene (PAS) can be hydrolyzed with $NH_3$ (aqueous). However, as demonstrated with this comparative example, $NH_3$ did not work in hydrolyzing the copolymer (in suspension) and only when the hydroxylamine of the present invention was used, was the copolymer of PAS hydrolyzed to polyhydroxystyrene (PAS). Thus, it is quite unexpected to find that hydroxylamine is functional in suspension copolymerization while $NH_3$ and organic amines, i.e., carbon containing amines, do not work.

While the invention is described with respect to specific embodiments, modifications thereof can be made by one skilled in the art without departing from the spirit of the invention. The details of said embodiments are not to be construed as limitations except to the extent indicated in the following claims.

What is claimed is:

1. A process for producing a copolymer of 4-hydroxystyrene, comprising the step of reacting a copolymer of 4-acetoxystyrene with hydroxylamine.

2. A process according to claim 1 wherein the hydroxylamine is in the form of a free base.

3. A process according to claim 1 further including the step of deriving the hydroxylamine from an acid salt of the hydroxylamine prior to the reacting step.

4. A process according to claim 1 wherein more than 99.5 percent of the 4-acetoxystyrene parts of the 4-acetoxystyrene copolymer are converted to 4-hydroxystyrene parts.

5. A process according to claim 1 wherein the reacting step is carried out under a temperature of about 50° C. to about 95° C.

6. A process according to claim 1 wherein the copolymer of 4-acetoxystyrene is in its solid state.

7. A process according to claim 1 wherein the copolymer of 4-acetoxystyrene is in suspension.

8. A process according to claim 6 wherein the copolymer of 4-acetoxystyrene is suspended in an aqueous medium.

9. A process according to claim 6 wherein the copolymer of 4-acetoxystyrene is in the form of particles ranging from about 0.01 to about 2.0 millimeters in size.

10. A process according to claim 1 wherein the hydroxylamine is in an aqueous solution.

11. A process according to claim 1 further including the step of forming the copolymer of 4-hydroxystyrene in its solid state as a result of the reacting step.

12. A method of preparing a copolymer of 4-hydroxystyrene in suspension, comprising the step of hydrolyzing a 4-acetoxystyrene copolymer in suspension with hydroxylamine.

13. A method of preparing a copolymer of 4-hydroxystyrene, comprising the step of interacting a solid polymer of 4-acetoxystyrene with hydroxylamine.

14. A method according to claim 11 wherein the copolymer of 4-hydroxystyrene is solid.

15. A method according to claim 1 wherein the reacting step is carried out in the absence of oxygen.

* * * * *